Aug. 20, 1957    N. E. LEE    2,803,372
SEAL AND SHOCK MOUNT
Filed Nov. 16, 1954
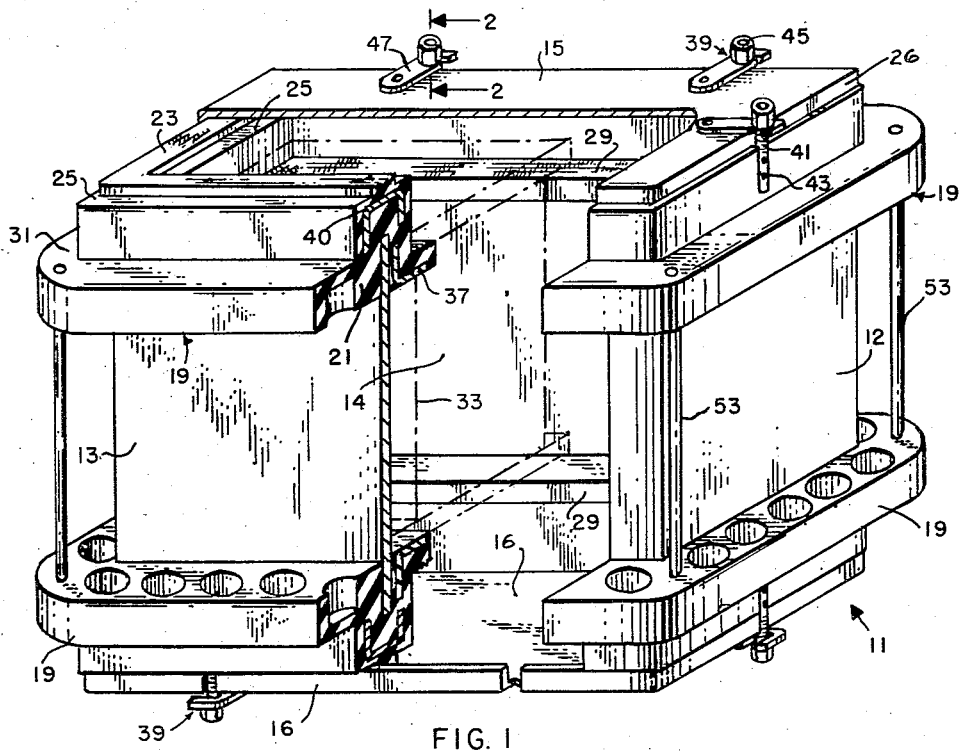
FIG. 1
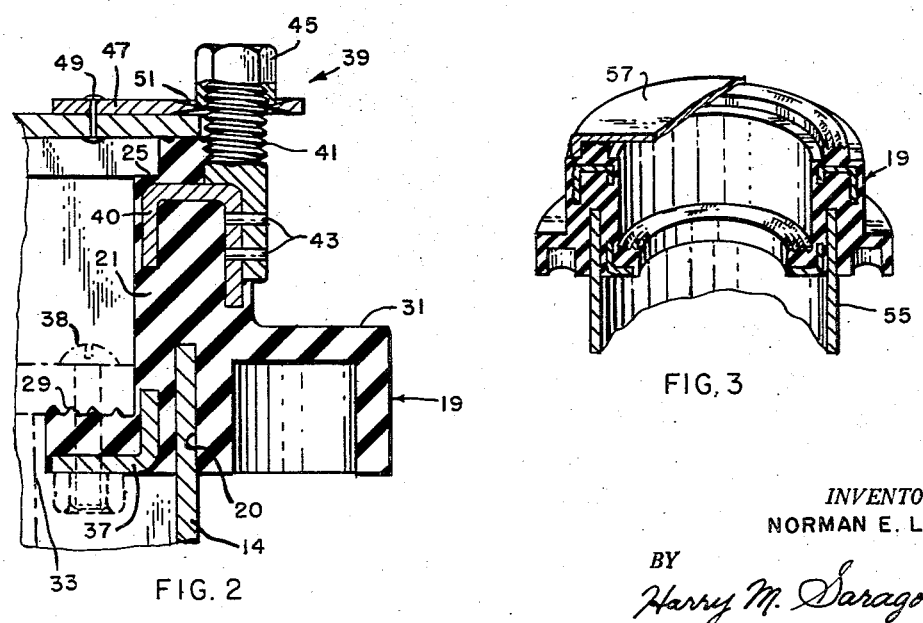
FIG. 2
FIG. 3
*INVENTOR.*
NORMAN E. LEE
BY
*Harry M. Saragovitz*
ATTORNEY

United States Patent Office 2,803,372
Patented Aug. 20, 1957

2,803,372

SEAL AND SHOCK MOUNT

Norman E. Lee, Red Bank, N. J., assignor to the United States of America as represented by the Secretary of the Army Application November 16, 1954, Serial No. 469,320

1 Claim. (Cl. 220—46)

(Granted under Title 35, U. S. Code (1952), sec. 266)

The invention described herein may be manufactured and used by or for the Government for governmental purposes, without the payment of any royalty thereon.

The present invention relates to enclosures or housings and has as its primary object the provision of a housing within which there may be confined a piece of equipment that is highly sensitive to shock and/or affected by the admission of foreign substances such as dirt, dampness, water, or the like.

More particularly, the present invention is concerned with a unique unitary assembly or mount made of a strip of resilient, pliable material that is secured to and adjacent the open ends of a housing, box-like container, or enclosure for affording shock-mount and sealing properties thereto.

By way of example of one particular use of this invention, its application will be explained in connection with the packaging of a device highly sensitive to shock, such as a radio. Such devices have to be so packaged whether for shipment and/or for temporary use so as to withstand repeated jarring of the radio due to sock or any excessive vibration that might be imparted to the container. In addition, adequate sealing means must be provided so that the radio in the container will not be deleteriously affected by outside elements. Heretofore, seals and shock mounts of varied shapes and designs have been separately and individually secured and attached to both the inside and outside of the containers to achieve the separately desired results. Such separate manufacture of seals and shock mounts and the separate installation thereof entailed high manufacturing and assembly costs resulting in very high costs for the fabrication of a container that is tightly sealed and properly mounted to prevent damage to the components of the container. This was particularly true when it was desired to have shock mounts and equipment sealing means within the container and shock mounting and cover sealing means on the outside of the container.

Accordingly, an object of the present invention is to provide both sealing and shock mount means in a unitary structure and further characterized by its adaptability to provide such sealing and shock mount means both within and on the outside of such container.

For a more detailed disclosure of the invention and for further objects and advantages thereof, reference is had to the following description taken in conjunction with the accompanying drawing in which:

Figure 1 is a view, in perspective, and partly cut away, of a container having incorporated thereon the preferred unitary form of shock mount and sealing means;

Figure 2 is a cross-sectional view taken on the line 2—2 of Figure 1, and

Figure 3 is a partial view, in perspective, of the sealing and shock mount means applied to a cylindrical container.

Referring to Figure 1 of the drawing, there is shown a container 11 comprising in part side walls 12, 13, and 14 and top and bottom covers 15 and 16 respectively. In Figure 1 it is to be noted that the cover 15 is partly cut away in order that there may be shown in cross-sectional detail the improved unitary shock mount and seal means generally designated at 19. The structure 19 is made preferably of a pliable and deformable material such as rubber or rubber-like plastic material and may be formed by any conventional method.

For ease of description, but one of the shock mount and sealing means, that is, the upper one as shown in Figure 1, will be described in detail, it being understood that the other is identical in structure.

The structure 19 is composed of a single continuous loop of rubber whose configuration in cross section resembles generally a T. The structure 19 includes an upright longitudinally disposed body portion 21, the bottom face of which is provided with a continuous longitudinal groove 20 adapted to securely hold one edge or rim of each of the side walls of the container 11. As is apparent from an inspection of Figure 1, two similar structures 19 are used in the assembly of the completed container 11, wherein the grooves 20 are oppositely disposed so that the side walls of the container are supported therebetween. In this manner the side walls of the container are cemented into the respective grooves 20 to form four sides of the container, which when provided with top and bottom covers 15 and 16, form the container substantially as shown. The other face of body portion 21 terminates in a raised continuous longitudinal fluted portion 23 forming shoulders 25 on either side of the raised portion. Shoulder 25 is adapted to support a downwardly extending flange portion 26 of cover 15 so that when the cover 15 is in position it is snugly in abutment with the shoulder 25, which in conjunction with the fluted surface 23 provides a most effective seal. The cover 15 is further provided with fixed spaced openings through which there can be secured cover locking means shown generally at 39 and described in detail hereinafter. Extending laterally from the side walls of body portion 21 on either side of groove 20 are flanged portions 29 and 31, the body portion and the flanged portions forming an integrated unitary structure. Relative to the walls of container 11, flanges 29 and 31 may be designated as the inner and outer flanges respectively. The inner flange 29 is similarly provided with a fluted upper surface which serves as a shelf-like ledge on which can be supported any box-like component such as a radio set 33. The corresponding flange 29 forming part of the lower shock and sealing structure 19 is also fluted and also serves to securely hold the radio within the container.

The outer flange 31 completely engirdles the side walls of the container 11 closely adjacent the top cover 15. Each outer flange portion is further characterized by having a series of equally spaced holes. By such an arrangement flanged portion 31 serves as a shock mount and vibration absorption medium for any shock or undue vibration that might be imparted to the container, such as by bouncing or jarring of the container.

For securing the radio or any other component within the container, a rigid supporting member should be provided. One such means is the angle iron 37 encased within the flange 29. In the modification of the invention shown in Figure 2, the radio 33 is held in place by a series of bolts, one of which is shown at 38. In the same manner, channel iron 40 may similarly be encased in the body portion 21 to afford supporting means for the locking means 39. In the particular modification shown herein, supporting members of particular contour have been shown. It is to be understood, however, that particular shapes and designs of supporting means for permitting attachment of any desired item to be supported to the structure 19 may be used as the need arises.

While forming no part of the invention herein, there is shown in Figures 1 and 2 the cover 15 and one particular type of locking means 39. The locking means 39 comprises in part a screw-like member 41 securely held in channel iron 40 in the body portion 21 by pins 43. A nut 45 threadably engages the screw-like member 41. A hook-like latch 47 is pivotably mounted on the cover 15 by means of pins 49. The inner edge of the bent hook portion is provided with a chamfer as shown at 51, which chamfered edge is adaptable for engagement with the grooved segments of the screw 41 as shown in Figure 2.

For ease in handling the container above described, there are provided four rigid metal handle bars 53 positioned between the flange portions.

In Figure 3 there is shown another modification of the invention wherein the sole difference is in the general contour of the container. In such a modification there is shown the container 55 of cylindrical shape in place of the conventional rectangular shape of the container of Figure 1 and provided with a cover 57. In all other respects, however, the sealing and shock mount means are substantially identical to that shown as used in conjunction with device of Figure 1.

While there has been described what is at present considered to be the preferred embodiment of this invention, it will be obvious to those skilled in the art that various changes and modifications may be made therein without departing from the invention, and it is, therefore, aimed in the appended claim to cover all such changes and modifications as fall within the true spirit and scope of the invention.

What is claimed is:

A container including a shock mount and sealing means comprising a pair of opposing spaced loops of resilient material, each of said loops having a central body portion having respective top and bottom faces, said bottom face having a continuous longitudinal groove, said top face having a continuous raised fluted portion, said loops being so positioned that the respective grooves are in opposing relationship to each other, side walls for said container having their respective top and bottom edges secured within the respective opposing grooves of the body portions, end covers on said fluted raised portions, means for locking said covers, and flanges forming part of said loops extending laterally from said body portion on either side of said groove, at least one of said flanges extending about the outer wall of said container and at least another of said flanges extending about the inner wall of said container for securing items to be confined within said container.

References Cited in the file of this patent
UNITED STATES PATENTS

| | | |
|---|---|---|
| 2,083,503 | Nelson | June 8, 1937 |
| 2,117,807 | Jesser | May 17, 1938 |
| 2,210,183 | Schweighart | Aug. 6, 1940 |
| 2,523,639 | Tucker | Sept. 26, 1950 |
| 2,591,482 | Weltlich | Apr. 1, 1952 |
| 2,683,579 | Wallace | July 13, 1954 |